United States Patent
Lin et al.

(10) Patent No.: US 7,417,623 B2
(45) Date of Patent: Aug. 26, 2008

(54) POINTING DEVICE AND DISPLACEMENT ESTIMATION METHOD

(75) Inventors: Chun-Huang Lin, Hsinchu (TW); Jeng-Feng Lan, Hsinchu (TW)

(73) Assignee: PixArt Imaging Inc., Hsin-Chu (TW)

( * ) Notice: Subject to any disclaimer, the term of this patent is extended or adjusted under 35 U.S.C. 154(b) by 709 days.

(21) Appl. No.: 10/875,346

(22) Filed: Jun. 24, 2004

(65) Prior Publication Data
US 2005/0151724 A1    Jul. 14, 2005

(30) Foreign Application Priority Data
Dec. 29, 2003   (TW) .............................. 92137319 A

(51) Int. Cl.
G09G 5/08    (2006.01)
(52) U.S. Cl. ...................... 345/166; 345/157; 345/158; 345/163
(58) Field of Classification Search ................ 345/166, 345/157–158, 163
See application file for complete search history.

(56) References Cited

U.S. PATENT DOCUMENTS 4,734,685 A * 3/1988 Watanabe .................. 345/157
5,621,434 A * 4/1997 Marsh ........................ 715/856
6,950,094 B2 * 9/2005 Gordon et al. .............. 345/166
7,042,439 B2 * 5/2006 Luo ............................ 345/157

* cited by examiner

Primary Examiner—Richard Hjerpe
Assistant Examiner—Leonid Shapiro
(74) Attorney, Agent, or Firm—Tung & Associates

(57) ABSTRACT

A method of estimating image displacement by block matching for a pointing device used in a computer system. The method provided in the present invention comprises capturing digital images sequentially using a photo capture device, obtaining a template frame and a current frame, estimating a predicted velocity vector, and computing the displacement of the image. The efficiency and reliability of block match searching are improved by reducing the search range according to the calculated displacement. The template block can be defined anywhere on the template frame according to the predicted velocity to extend the lifetime of the template frame, and the displacement vector between the template block and the center of the template frame is proportional to the predicted velocity.

3 Claims, 5 Drawing Sheets

POINTING DEVICE AND DISPLACEMENT ESTIMATION METHOD

BACKGROUND OF THE INVENTION

1. Field of the Invention

The present invention relates to displacement estimation, and more specifically, to displacement estimation for an optical mouse using a predicted velocity.

2. Description of the Related Art

A pointing device such as mouse is a standard peripheral for a computer system. A mechanical mouse typically has rollers, wheels, or the like, that contact a rubber-surfaced steel ball at the equator thereof and convert the rotation of the ball into electrical signals. The mechanical mouse has a number of shortcomings such as deterioration or damage to the surface of the mouse ball and mouse pad, resulting from the mechanical construction and operation thereof that rely to a significant degree on a fairly delicate compromise among the mechanical forces involved. An optical mouse utilizes optical and electronic method to compute the movement of the mouse, and is a popular replacement for the mechanical mouse. Compared with the conventional mechanical mouse, an optical mouse offers better reliability and performance. Thus optical pointing devices have captured a significant share of the mouse market.

An optical mouse typically has a logical operation circuit and a Complementary Metal Oxide Semiconductor (CMOS) photosensing array comprising photo detectors. The CMOS photosensing array sequentially captures images of the area in which the optical mouse moves and generates digital signals representing the captured image. The digital image varies with the movement of the optical mouse. The logical operation circuit computes the displacement of the optical mouse according to the dynamic change in the digital image, and directs the computer to control the pointer (cursor) on the screen in accordance with movement of the mouse.

The displacement of the optical mouse is commonly tracked and estimated by block matching. Block matching is accomplished by comparing a newly captured sample frame (current frame) with a previously captured reference frame (template frame) to ascertain the direction and amount of movement. Conventional block matching performs a fully search pf block with a predetermined size. As shown in FIG. 1, the template frame 100 and current frame 104 are digital images of a 6*6 pixel area. If these two digital images are fully searched using a 2*2 pixel block, the computer must perform 25*25 (625) correlation computations. If two digital images of 16*16 pixels are fully searched with an 8*8 pixel block, the computer must perform 81*81 (6561) correlation computations.

The number of correlation computations can be greatly reduced if a template block in the template frame is used for block matching instead of the full searching process. As shown in FIG. 1, a 2*2 template block 102 is located in the center of the template frame 100. Accordingly, the computer only needs to perform 5*5 (25) correlation computations for the current frame 104 when using the 2*2 block as a search unit. Block matching determines a block with the least difference (greatest correlation) after comparing all the 2*2 blocks (from block 106 to block 108) in the current frame 104 with the template block 102. Note that the searching order is not limited to the described order. If two digital images with 16*16 pixels are searched with an 8*8 pixel block, a total of 9*9 (81) correlation computations must be performed. Although the use of template block significantly reduces the number of searching and computation cycles, a large size image still requires long computation time to compare each block with the template block. Furthermore, performing a fully search using a template block also requires a large amount of memory and processor capacity for large digital images.

SUMMARY OF THE INVENTION

Accordingly, the object of the present invention is to provide a displacement prediction method and a pointing device used in a computer system. The pointing device of the present invention comprises photo detectors that capture images sequentially, obtain a template frame and current frame, and predict moving velocity vector to calculate the image displacement.

Another object of the present invention is to reduce the search range in the current frame for block matching according to the predicted displacement.

Yet another object of the present invention is to determine the location of the template block in the template frame according to the predicted displacement in order to extend the valid period of the template frame, hence decreasing the frequency of template frame updates.

The present invention provides a hand held pointing device for a computer system, which comprises a photo capture device and a displacement detection circuit. The photo capture device captures images sequentially to produce a first frame and a second frame, whereas the displacement detection circuit predicts a velocity of the pointing device, and compares the first frame to the second frame according to the predicted velocity to obtain a displacement of the pointing device. The photo capture device of the present invention comprises a photosensing array with a plurality of photo detectors, and the size of each photo detector in the photosensing array is between 20 μm*20 μm to 40 μm*40 μm.

The present invention further comprises a method for estimating the displacement of a pointing device, wherein the pointing device comprises a photo capture device for capturing images sequentially to produce corresponding frames. First, a velocity of the pointing device is predicted, and according to the predicted velocity, a first frame is compared with a second frame produced by the photo capture device to obtain a displacement of the pointing device. The velocity is predicted according to at least two previous velocity data. The first and second frames are compared by first defining a template block in the first frame, defining a search range in the second frame according to the predicted velocity, and lastly, searching a matched block in the search range to output the displacement. The matched block is the block in the search range that has the smallest difference when compared to the template block. The method of the present invention further comprises computing the acceleration of the pointing device, and predicting the velocity according to the acceleration and at least one previous velocity data. The method of defining the search range comprises computing a predicted block with the same size as the template block according to the predicted velocity, wherein the predicted block is the block in the second frame with the most possible locations for the template block under the predicted velocity of the pointing device. The predicted block is then extended to form the search range. The predicted block is extended either symmetrically or asymmetrically.

The method provided in the present invention further comprises defining a template block according to the predicted velocity, wherein the template block is not in the center of the first frame. The displacement vector between the template block and the center of the first frame is proportional to the predicted velocity.

The search algorithm for block matching is typically related to correlation computation, for example, mean square error (MSE) and mean absolute difference (MAD). These algorithms compute the error or difference between two blocks using specific formulas, and the smaller the error, the larger the correlation between the two blocks. A matched block is defined as a block that has the greatest correlation to the template block (or reference block).

BRIEF DESCRIPTION OF THE DRAWINGS

The present invention can be more fully understood by reading the subsequent detailed description in conjunction with the examples and references made to the accompanying drawings, wherein:

FIG. 2b is a block diagram of the integrated circuit chip shown in FIG. 2a.

DETAILED DESCRIPTION OF THE INVENTION

Figure 1:
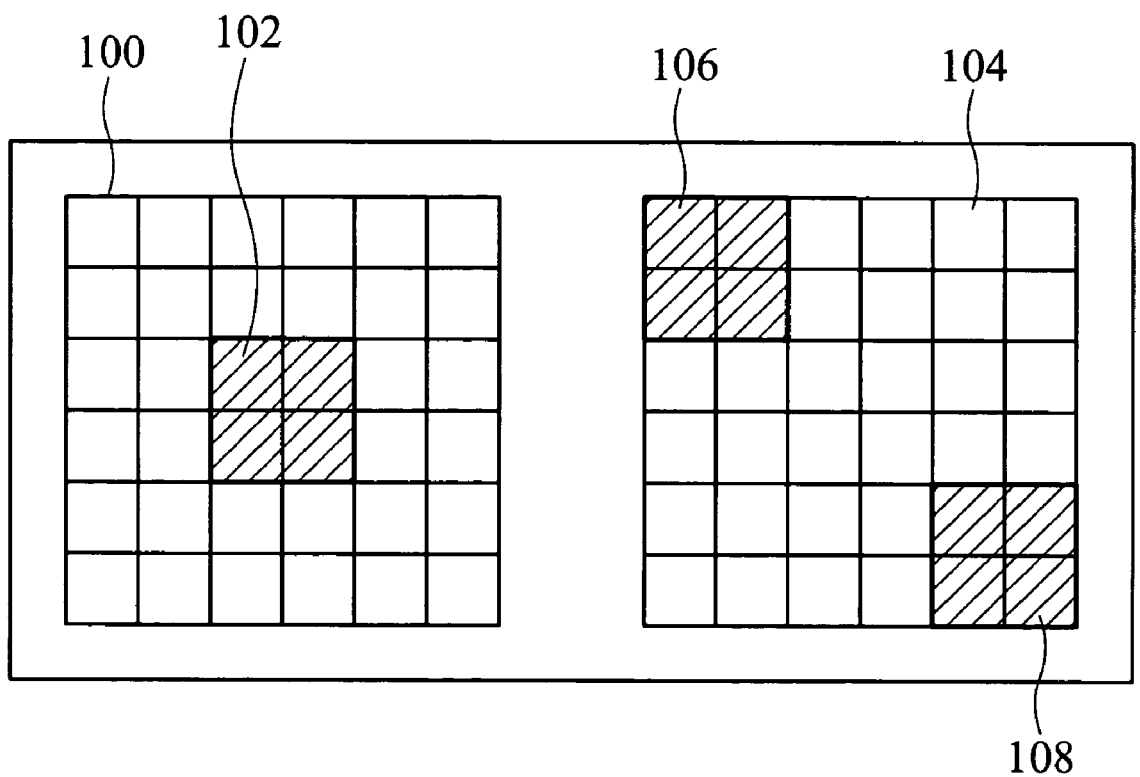
FIG. 1 illustrates the conventional fully search method for block matching.
Figure 2A:
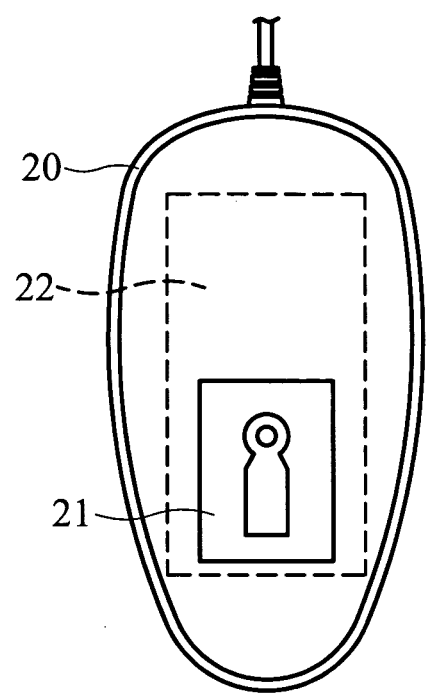
FIG. 2a is a diagram illustrating a typical optical mouse.
Figure 2B:
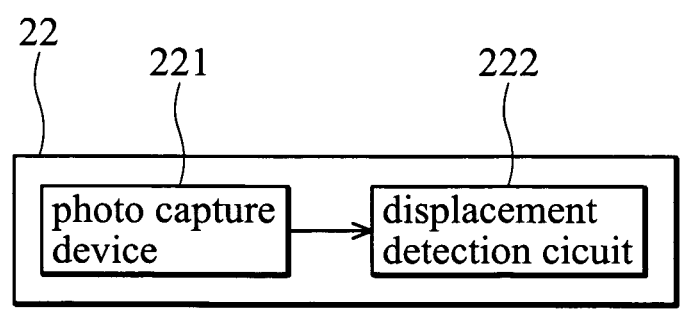

FIG. 2a is an optical mouse for implementing the present invention, and FIG. 2b is a block diagram of the integrated circuit chip shown in FIG. 2a. The optical mouse 20 comprises a lens 21 and an integrated circuit (IC) chip 22. As shown in FIG. 2b, the integrated circuit chip 22 is generally divided into two regions. One is a photo capture device 221, for example, an array composed of Complementary Metal Oxide Semiconductor (CMOS) photo detectors. The lens 21 reflects the surface under the optical mouse 20 to the photo capture device 221. The photo capture device captures the images sequentially according to a preset frame rate to generate corresponding images, or the so called "frame". The captured frame varies with movement of the optical mouse 20. Another region in the integrated circuit chip 22 is a displacement detection circuit 222 for processing and computing the captured frames. The displacement detection circuit 222 tracks the movement of the optical mouse 20 by comparing a plurality of captured frames to determine the displacement of the optical mouse 20. The displacement detection circuit 222 then informs other devices, such as the computer, of the displacement of the optical mouse 20.

The present invention provides a method utilizing the predicted velocity for comparing frames in a block matching operation. The search range can be reduced according to the predicted velocity, thus reducing the number of required computations in the displacement detection circuit. Furthermore, the present invention extends the lifetime of the template frame (due to lower frequency of template frame updates), and increases the resolution of the output signals from the optical mouse.

The photo capture device 221 captures the digital image according to a preset rate, and selects a digital image as a new template frame. A template block in the template frame is then selected and compared to the searching range in the current frame to obtain a matched block that has the smallest difference when compared to the template block. The displacement is calculated by comparing the location of the template block in the template frame with the location of the matched block in the current frame. The calculated displacement represents the movement of the optical mouse or the photo capture device during the photo capture period. If the photo capture period is set as a unit time, the calculated displacement is the instantaneous velocity of the image. Since the displacement is a directional vector, it can be represented by two components, x and y. Instantaneous velocity V is also a vector, and can thus be represented as (Vx, Vy). An average velocity Vm (Vmx, Vmy) is derived by accumulating M instantaneous velocities, and similarly, an average velocity Vn (Vnx, Vny) is derived by accumulating N instantaneous velocities. If M is greater than N, the predicted velocity Vp of the images estimated by the photo capturing device is obtained according to Equation (1). Equation (1) can be decomposed into Equations (2) and (3) for calculating the x and y components individually.

$$\vec{V}p = \frac{\vec{V}m + \vec{V}n}{2} + (\vec{V}m - \vec{V}n) \quad \text{Equation (1)}$$

$$Vpx = \frac{(Vmx + Vnx)}{2} + (Vmx - Vnx) \quad \text{Equation (2)}$$

$$Vpy = \frac{(Vmy + Vny)}{2} + (Vmy - Vny) \quad \text{Equation (3)}$$

The predicted velocity Vp is also the predicted displacement of the photo capture device during the next capture period, which indicates the predicted location of the matched block with respect to the location of the template block.

Figure 3:
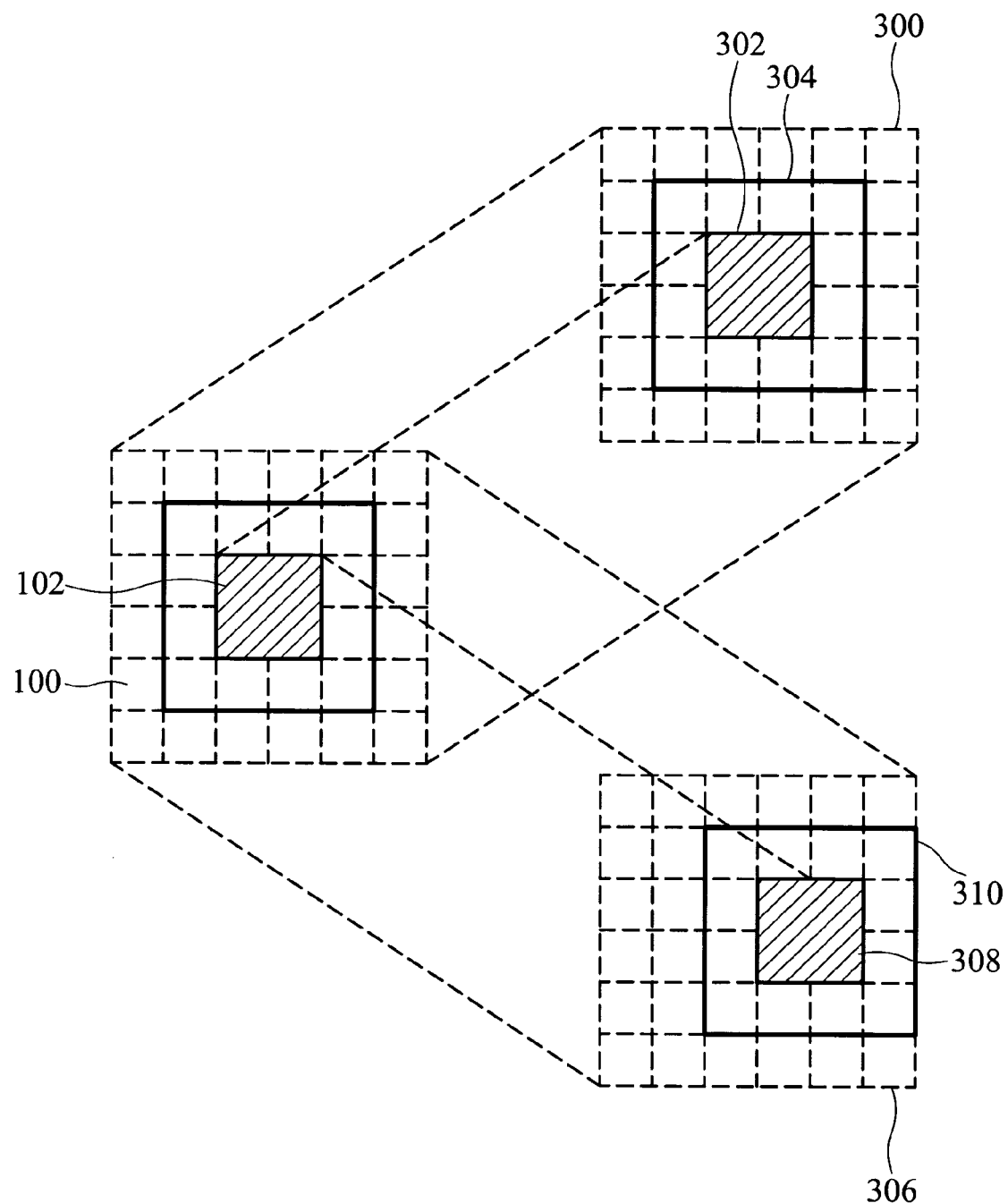
FIG. 3 illustrates searching the matched block within a specific searching range according to an embodiment of the present invention.

The location of the matched block is predicted according to the predicted velocity Vp. As shown in the example of FIG. 3, the size of each frame is 6*6 pixels, and the size of the block for block matching is 2*2 pixels. The block matching algorithm proposed in the present invention does not perform a fully search of the current frame, but only searches the blocks in a searching range derived by the predicted velocity. The search time, as well as the computational load on the processor can be significantly reduced by reducing the search range. The search range is restricted by the predicted velocity, so only the blocks in the search range require correlation computation.

As shown in FIG. 3, the predicted velocity and the displacement are all zero in the initial state. The predicted location of the matched block 302 (i.e. predicted block) in the current frame 300 is most likely to be the same as the location of the template block 102. The template block is assumed to be at the center of the template frame. The estimated search range 304 is derived by extending one pixel in all directions from the predicted matched block 302. After a period of time, the image shifts to the right, and the predicted matched block shifts right by one pixel. The predicted matched block is now at location 308 in the current frame 306, thus the corresponding search range shifts to location 310.

If the current frame 300 in the example shown in FIG. 3 is fully searched using a 2*2 template block 102, 5*5 (25) correlation computations are required to obtain the corresponding matched block. Only 3*3 (9) computations, however, are required when searching the blocks within the search range 304 according to the present invention. When the present invention is implemented for matched block searching in a large image frame, or an image of any size, the number of computations is still 9 if the search range is derived by extending one pixel from the predicted matched block. If the search range is defined as extending two pixels from the expected matching block, the number of correlation computations is always 25 regardless of the sizes of the image frame and template block. The computational load only depends on the distance extended for the search range. The computational load of the present invention is far less than the fully search method of the conventional block matching method. For example, a 16*16 digital image is searched using an 8*8 template block. The conventional fully search requires 81*81 (6561) computations while searching using one template block requires 9*9 (81) computations, whereas the present invention only requires 5*5 (25) or 3*3 (9) correlation computations depending on the size of the predetermined search range. The search algorithm for block matching is typically related to correlation computation, for example, mean square error (MSE) and mean absolute difference (MAD).

Figure 4:
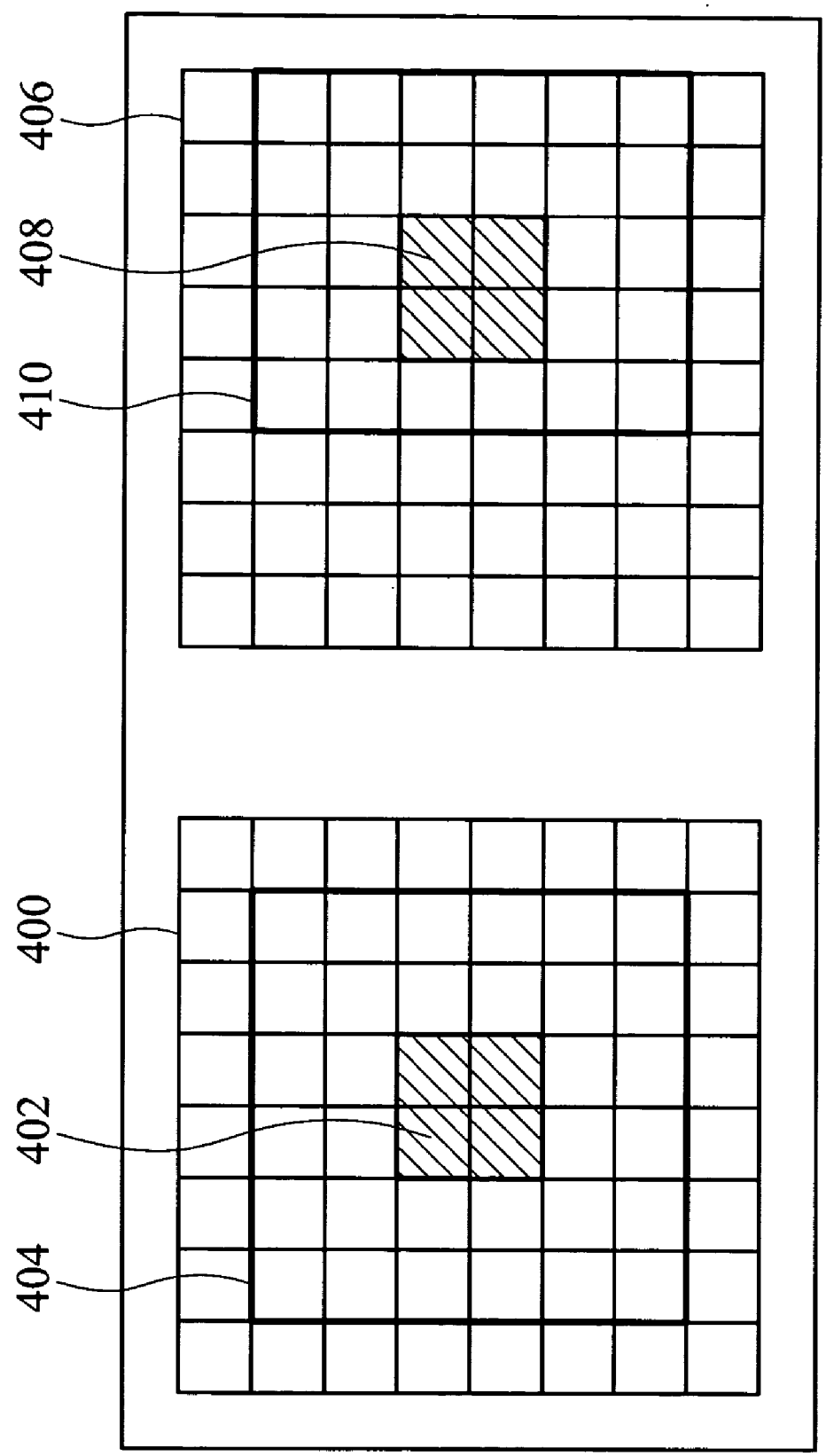
FIG. 4 illustrates an example of changing the search range according to the principles of the present invention.

The search range can be defined by extending N pixels symmetrically around the predicted matched block, or the extended distance can be asymmetrical. As shown in FIG. 4, the search range 404 of the current frame 400 is derived by extending the expected matched block 402 two pixels in each direction. The initial predicted velocity is zero, so the predicted matched block 402 is in the center of the current frame 400. A predicted velocity can be estimated when the image changes, and is used to estimate the location of the predicted matched block in the next frame. As shown in FIG. 4, if the location of the predicted matched block 408 in the current frame 406 shifts right by one pixel from the previous predicted matched block 402, the image is assumed to have a higher probability of having shifted right than in other directions, which means that the next matched block is most likely found on the right side of the predicted matched block 408, rather than on the left side. Therefore, as shown in the Figure, the left side of the search range can be reduced from two pixels to one pixel apart from the predicted matched block 408. The search range 410 is set based on an acceleration of the photo capture device, and can be either symmetrical or asymmetrical. By doing so, the search range is further reduced in size, and the number of correlation computations is also reduced.

The size of the searching range as previously described is determined by the maximum acceleration of the images. Assuming that the photo capture device captures 1000 digital images per second, the search range is derived by extending one pixel from the expected matching block in all directions, and the size of a pixel is 30 µm, then the maximum acceleration of the images is derived from Equation (4) as 30 ms$^{-2}$. 30 ms$^{-2}$ of acceleration is equivalent to 3.06 times the gravity G. If the capture rate is 1000 images per second, the search range derived by extending one pixel from the predicted matched block is enough in most applications as the maximum acceleration of the movement would not exceed 30 ms$^{-2}$.

$$a = \frac{\Delta v}{T_{frame}} = \frac{d_{pixel}}{T_{frame}^2} = \frac{30 * 10^{-6} m}{\left(\frac{1}{1000} s\right)^2} = 30 \text{ ms}^{-2} = 3.06 \text{ G} \quad \text{Equation (4)}$$

The advantages of using the predicted velocity to reduce the search range comprise reducing the number of correlation computations, and increasing the accuracy of block matching.

The size of the photo capture device 221 is typically 60 µm*60 µm, and the lens 21 has a magnification ratio of 1. For example, the array in the photo capture device comprise 16*16 CMOS photo detectors and the template block is 8*8, the visible range of the photo capture device 221 is 960 µm*960 µm, and the size of the template block is 480 µm*480 µm. Current printing resolution is around 150~200 Dots Per Inch (DPI), and resolution of 150 DPI is given in the following example. If one dot represents a feature, there will be approximately (150/inch*60 µm*16)$^2$=5.67$^2$≈32 features on a frame captured by the photo capture device 221, and a 8*8 template block covers roughly 8 features.

Figure 5:
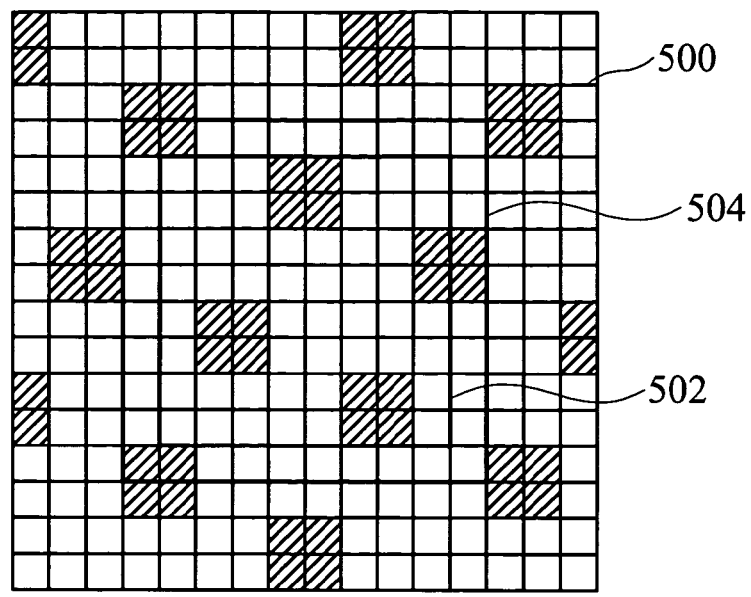
FIG. 5 illustrates an example of a current frame with several repeating features.

The conventional method of block matching searches the matched block in the current frame using a template block, and because there are many repeating patterns in one frame, the number of features covered may be more than one, which causes more than one matched blocks to be found in the current frame and complicates the determination of optical mouse movement. As shown in FIG. 5, the template block of the template frame might find several identical matched blocks in the current frame 500, and the optical mouse may be unable to determine the displacement, or make a wrong determination.

The present invention reduces the search range according to the predicted velocity, which also reduces the chance of finding more than one identical matched block. As shown in FIG. 5, if the searching range 502 is a 10*10 block covering the matched block 504 in the center, the number of features in the search range 502 is reduced to 4, and the probability of finding more than one matched block is reduced. Therefore, the present invention improves the reliability of block matching by reducing the search range for block matching.

This improvement of reliability is more obvious if the number of features captured by the photo capture device is reduced. Assume that the size of the photo capture device is 30 µm*30 µm, the magnification ratio of the lens is unity (one), and the printing resolution is 150 DPI. The number of features on a frame captured by the photo capture device is approximately (150/inch*30 µm*16)$^2$=8.035. Whereas the 8*8 template block covers approximately 2 features, and the search range covers around 3 features. Therefore, a single matched block can be more easily found when the amount of repeating features is reduced.

One way to reduce the number of features in a frame is to reduce the size of the image captured by the photo capturing device. The present invention proposes a photo capture device capturing images with a size between 20 µm*20 µm~40 µm*40 µm. Another way to reduce the number of features in a frame is to increase the magnification ratio of the lens, so that the lens magnifies the surface under the optical mouse and feeds the magnified images to the photo capture device.

Figure 6:
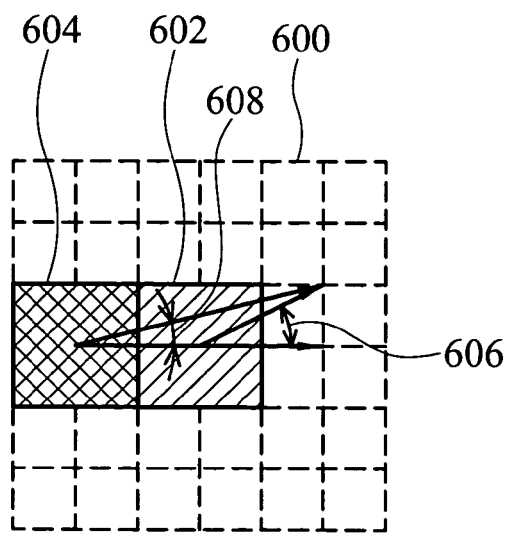
FIG. 6 illustrates an example of changing the position of the template block according to the principles of the present invention.

Furthermore, the present invention proposes a method for changing the location of the template block according to the predicted velocity of the optical mouse or the photo capture device. As shown in FIG. 6, the template block in the template frame 600 moves from the center 602 to the location 605 to the left when the optical mouse detects movement to the right. Moving the template block in the opposite direction of the image extends the lifetime of the template frame, thus minimizing the frequency of frame updates. As the image moves to the right, the block 602 in the center will leave the current frame prior to the block 604 to the left side, as the block 604 at the left has a higher chance of appearance in the current frame. Assuming the template frame still overlaps the current frame, and the matched block is searchable in the current frame, changing the template block to block 604 reduces the detectable minimum shift angle 608 ($\tan^{-1}(1/4)$=14 degrees). In comparison with the original template block 602, the detectable minimum shift angle 606 is only $\tan^{-1}(1/2)$=26.5 degrees. The tracking of the movement has higher accuracy if the detectable minimum shift angle is smaller.

The present invention changes the location of the template block as well as sets the search range according to predicted velocity. The template block can be changed when the predicted velocity reaches specific point, then sets the search range when the predicted velocity reaches another specific point. It is also possible to set the search range first, then change the location of the template block.

The embodiment of the present invention utilizes illumination as an example of the feature, whereas other image features such as chrominance are also applicable for the feature enhancement method proposed in the present invention.

Finally, while the invention has been described by way of example and in terms of the above, it is to be understood that the invention is not limited to the disclosed embodiment. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A pointing device for a computer system, comprising:
a photo capture device, capturing images sequentially to produce a first frame and a second frame; and
a displacement detection circuit, predicting a velocity of the pointing device, and comparing the first frame and the second frame according to the predicted velocity to obtain a displacement of the pointing device, wherein the predicted velocity is estimated as:

$$\vec{V}p = \frac{\vec{V}m + \vec{V}n}{2} + (\vec{V}m - \vec{V}n)$$

where $\vec{V}m$ and $\vec{V}n$ comprise average velocities by accumulating m and n instantaneous velocities respectively and m>n.

2. A pointing device for a computer system, comprising:
a photo capture device, capturing images sequentially to produce a first frame and a second frame; and
a displacement detection circuit, predicting a velocity of the pointing device, and comparing the first frame and the second frame according to the predicted velocity to obtain a displacement of the pointing device,
wherein the step of comparing the first frame and the second frame further comprises:
defining a template block in the first frame;
defining a search range in the second frame according to the predicted velocity; and
searching a matched block in the searching range in order to output the displacement, wherein the matched block is the block with the greatest correlation to the template block;
wherein the step of defining the searching range further comprises the following steps:
computing an predicted block according to the predicted velocity, wherein the predicted block is the same size as the template block, and is the most probable location in the second frame for the template block according to the predicted velocity of the pointing device; and
extending the predicted block to set the search range;
and wherein each frame comprises X pixels*Y pixels, and the predicted block is extended symmetrically by at least one pixel to form search range.

3. A pointing device for a computer system, comprising:
a photo capture device, capturing images sequentially to produce a first frame and a second frame; and
a displacement detection circuit, predicting a velocity of the pointing device, and comparing the first frame and the second frame according to the predicted velocity to obtain a displacement of the pointing device,
wherein the step of comparing the first frame and the second frame further comprises:
defining a template block in the first frame;
defining a search range in the second frame according to the predicted velocity; and
searching a matched block in the searching range in order to output the displacement, wherein the matched block is the block with the greatest correlation to the template block;
wherein the step of defining the searching range further comprises the following steps:
computing an predicted block according to the predicted velocity, wherein the predicted block is the same size as the template block, and is the most probable location in the second frame for the template block according to the predicted velocity of the pointing device; and
extending the predicted block to set the search range;
and wherein the predicted block is extended asymmetrically to form the search range.

* * * * *